US011244075B2

(12) United States Patent
Piret et al.

(10) Patent No.: US 11,244,075 B2
(45) Date of Patent: Feb. 8, 2022

(54) INTEGRITY OF ON DEMAND CODE DECRYPTION

(71) Applicant: NAGRAVISION SA, Cheseaux-sur-Lausanne (CH)

(72) Inventors: Eric Piret, Betton (FR); Wyseur Brecht, Penthalaz (BE); Laurent Dore, Thorigne-Fouillard (FR)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 347 days.

(21) Appl. No.: 16/336,120

(22) PCT Filed: Sep. 29, 2017

(86) PCT No.: PCT/EP2017/074842
§ 371 (c)(1),
(2) Date: Mar. 25, 2019

(87) PCT Pub. No.: WO2018/060459
PCT Pub. Date: Apr. 5, 2018

(65) Prior Publication Data
US 2020/0019730 A1 Jan. 16, 2020

(30) Foreign Application Priority Data
Sep. 30, 2016 (EP) .................................. 16191975

(51) Int. Cl.
G06F 11/30 (2006.01)
G06F 12/14 (2006.01)
(Continued)

(52) U.S. Cl.
CPC .............. *G06F 21/64* (2013.01); *G06F 21/14* (2013.01); *G06F 21/51* (2013.01); *G06F 21/54* (2013.01);
(Continued)

(58) Field of Classification Search
CPC .......... G06F 21/64; G06F 21/14; G06F 21/51; G06F 21/54; G06F 21/602; G06F 2221/2123
See application file for complete search history.

(56) References Cited

U.S. PATENT DOCUMENTS

2003/0188231 A1\* 10/2003 Cronce .................. G06F 21/51
714/52
2011/0202996 A1\* 8/2011 Monsifrot ............... G06F 11/28
726/22

(Continued)

FOREIGN PATENT DOCUMENTS

EP 2378452 A1 10/2011

*Primary Examiner* — Trong H Nguyen
(74) *Attorney, Agent, or Firm* — David P. Owen; Hoyng Rokh Monegier B.V.

(57) ABSTRACT

A system and a method for monitoring the integrity of code are provided. Dummy code is provided in an on demand decryption area of an object file while runtime code is provided elsewhere (and may be in the same object file or another object file). A compensation area is also provided which is initially blank. During execution, checksums can be calculated based on the result of an exclusive or (XOR) operation between contents of the on demand code decryption area and a compensation area such as a compensation area. As the runtime code populates the on demand code decryption area with the runtime code (potentially with the exception of areas masked to maintain integrity of relocation instructions allowed to remain in the dummy code) the compensation area is populated with the result of an XOR operation between the dummy code and the runtime code. As a result, the checksums will be the same throughout execution as long as integrity of the code has not been compromised.

15 Claims, 19 Drawing Sheets

(51) Int. Cl.
*G06F 21/64* (2013.01)
*G06F 21/14* (2013.01)
*G06F 21/51* (2013.01)
*G06F 21/54* (2013.01)
*G06F 21/60* (2013.01)

(52) U.S. Cl.
CPC .... G06F 21/602 (2013.01); *G06F 2221/2123* (2013.01)

(56) References Cited

U.S. PATENT DOCUMENTS

2011/0258516 A1* 10/2011 Salmon-Legagneur ............ G06F 21/54 714/768
2012/0260102 A1   10/2012 Zaks et al.

* cited by examiner

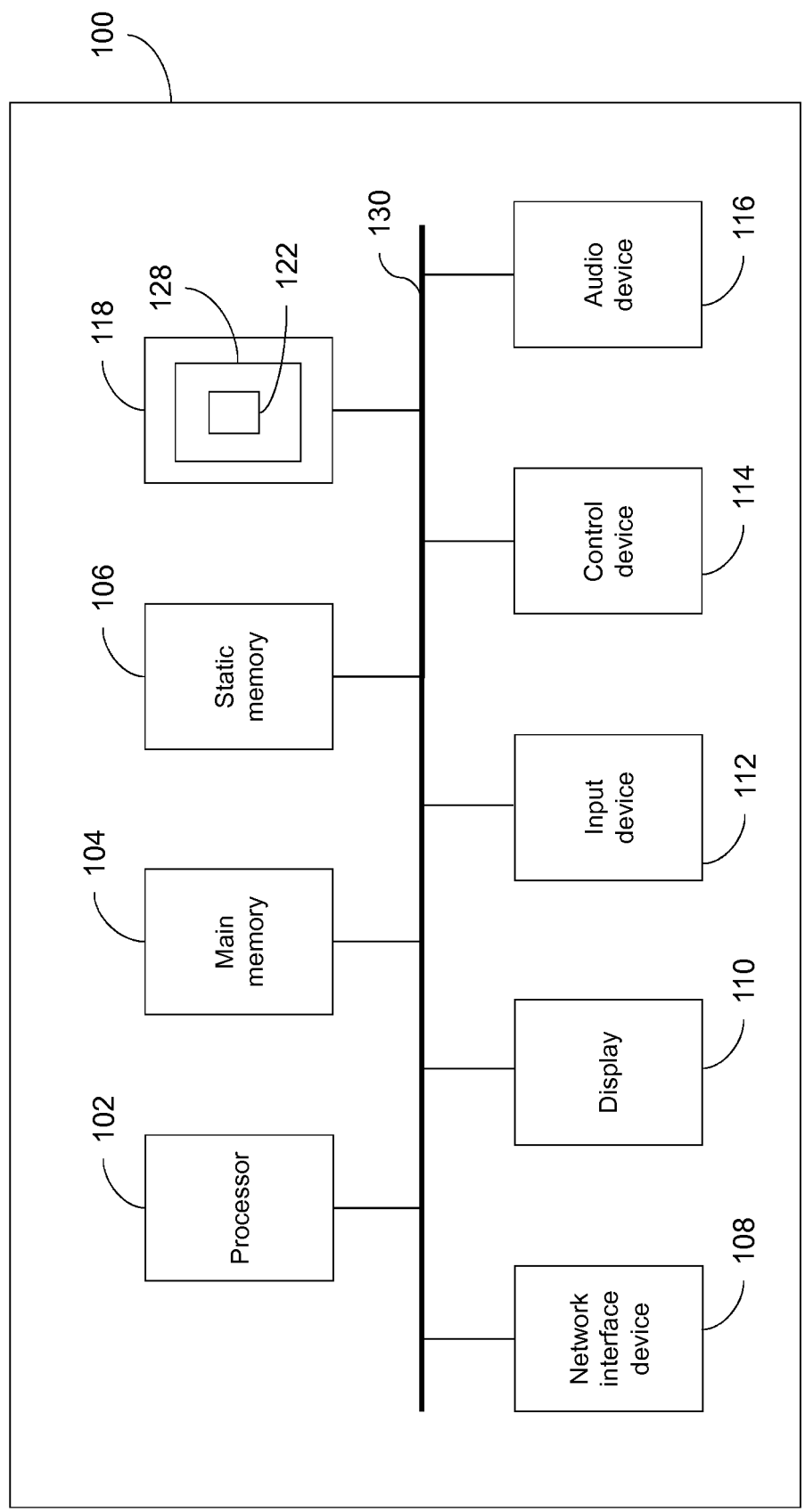

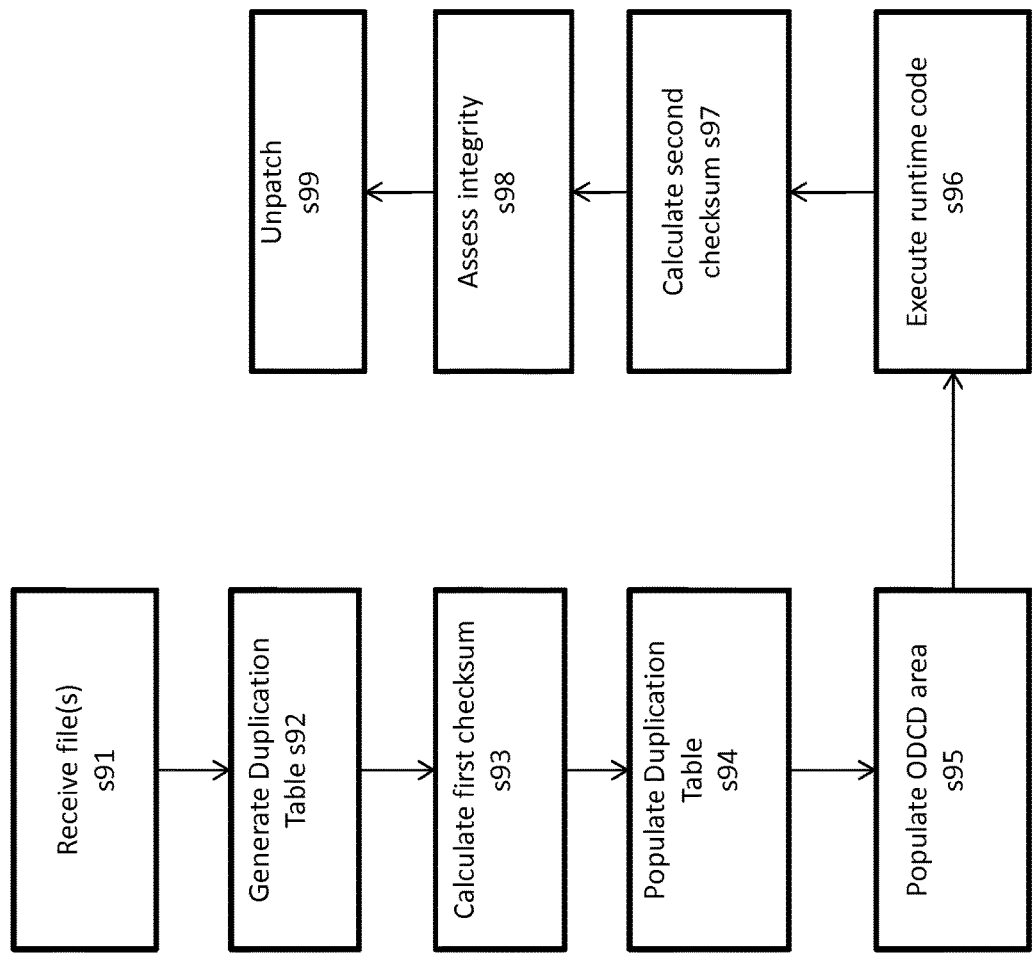

When ODCD is not patched
Checksum computation on of the ODCD area

INTEGRITY OF ON DEMAND CODE DECRYPTION

FIELD

The present disclosure relates to a system and method for monitoring the integrity of code, for example within an on demand code decryption process.

BACKGROUND

Software can be subject to malicious attack by external parties, such as reverse engineering attacks. In view of this, various techniques have been developed to protect software from such attacks.

An example of such a technique is known as "on-demand code decryption". According to this technique, some elements, or "chunks", of the code are delivered in an encrypted form. These are decrypted just prior to execution and then purged afterwards. This can in particular mitigate static analysis techniques which examine the code without executing it. Static analysis techniques include multiple variations and typically involve disassembling machine code.

Another technique for the protection of code against tampering are integrity checks using checksums (which can also be referred to as "fingerprints"). A checksum/fingerprint can be carried out for a piece of code and if this does not match an expected value then potential tampering can be inferred. However, in the context of on demand code decryption, the code in a particular area is modified during execution, which can imply a variation in the checksum in the absence of any tampering.

BRIEF DESCRIPTION OF THE DRAWINGS

FIG. 1 shows a hardware infrastructure for implementing a preferred embodiment;

FIG. 9 shows a flow chart of an on-demand decryption process in which checksum results are calculated;

DETAILED DESCRIPTION OF THE DRAWINGS

Figure 2A:
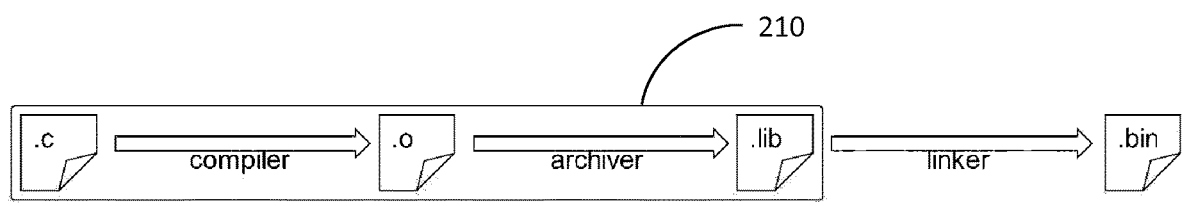
FIG. 2A illustrates a compiling process according to a known technique.

In overview, a system and a method for monitoring the integrity of code are provided. Dummy code is provided in an on demand decryption area of an object file while runtime code is provided elsewhere (and may be in the same object file or another object file). A compensation area is also provided which is initially blank. During execution, checksums can be calculated based on the result of an exclusive or (XOR) operation between contents of the on demand code decryption area and a compensation area such as a compensation area. As the runtime code populates the on demand code decryption area with the runtime code (potentially with the exception of areas masked to maintain integrity of relocation instructions allowed to remain in the dummy code) the compensation area is populated with the result of an XOR operation between the dummy code and the runtime code. As a result, the checksums will be the same throughout execution as long as integrity of the code has not been compromised.

In some aspects of the disclosure there is provided a method, for example a method for monitoring the integrity of code. The method comprises receiving one or more files in which dummy code occupies an on demand code decryption area and runtime code is provided elsewhere. The method further comprises initialising a compensation area to take an initial value. A first checksum result is calculated that depends on contents of the on demand code decryption area and contents of the compensation area. The compensation area is populated with the result of an operation carried out in dependence on the dummy code and the runtime code and the on demand code decryption area is populated with at least part of the runtime code. A second checksum result is then calculated that depends on contents of on demand code decryption area and contents of the compensation area. The first and second checksum results are utilised to infer the integrity of one or both of the real code and the dummy code. The method for monitoring may act to verify the integrity of code when the checksum results are as expected.

By calculating checksum results using a compensation area in this way, tampering with the code may be identified while at the same time enabling a process where runtime code may be substituted into an on demand code decryption area in place of dummy code. In particular, while the data in the on demand code decryption area may change, the checksum results depend not just on this but on the compensation area, the contents of which are also modified to compensate for the change in the on demand encryption area. Accordingly, if the comparison of checksum results shows a change then this will imply a loss of integrity in one or both of the dummy code or runtime code.

The dummy code may be fake code. It may be code that simulates or resembles real code. Alternatively, the dummy code may be random or otherwise. The dummy code may not be intended for execution, or may be executable.

The compensation area may be a duplication table. In some embodiments, the compensation area is initially blank (i.e. has an initial value of zero). The first checksum result may be calculated on the result of an exclusive or operation between the on demand code decryption area and the compensation area. The compensation area may be populated with the result of an exclusive or operation between the on demand code decryption area and the runtime code. The on demand code decryption area may be populated with the result of an exclusive or operation between the dummy code and compensation area. The second checksum result may be calculated on the result of an exclusive or operation between the on demand code decryption area and the compensation area.

The approach also enables elements of the dummy code to be retained in the on demand decryption area by setting corresponding positions in the runtime code to take a predefined value (which may be zero—i.e. the corresponding positions may be blank). In some embodiments, relocation directions are provided at defined locations in the dummy code and corresponding locations in the runtime code are set to the predefined value. This can enable relocation instructions within the object files to be handled by a linker without knowledge of the runtime code.

In some embodiments, the method further comprises, prior to calculating the second checksum result, executing the runtime code. As such, the runtime code that has been transferred to the on demand code decryption area can be executed and furthermore the second checksum will reflect any tampering that may take place during execution.

In some embodiments, the runtime code is encrypted within the one or more files. This encryption may include calculating the result of an exclusive or operation between the runtime code and the dummy code.

In some embodiments, the one or more files are object files.

In some embodiments, the method may further comprise, after calculating the second checksum result, populating the on demand decryption area with the result of an exclusive or operation between the on demand decryption area and the compensation area. The compensation area may further be set to be blank. In this manner, the contents of the on demand decryption area may be returned to its original state.

In some aspects of the disclosure, a computer program product is provided comprising computer executable instructions for carrying out the method described above. In further aspects, a system is provided for carrying out the method described above.

Some specific embodiments are now described by way of illustration with reference to the accompanying drawings in which like reference numerals refer to like features.

FIG. 1 illustrates a block diagram of one implementation of a computing device 100 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 100 includes a processing device 102, a main memory 104 (e.g., read-only memory (ROM), flash memory, dynamic random access memory (DRAM) such as synchronous DRAM (SDRAM) or Rambus DRAM (RDRAM), etc.), a static memory 106 (e.g., flash memory, static random access memory (SRAM), etc.), and a secondary memory (e.g., a data storage device 118), which communicate with each other via a bus 130.

Processing device 102 represents one or more general-purpose processors such as a microprocessor, central processing unit, or the like. More particularly, the processing device 102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 102 may also be one or more special-purpose processing devices such as an application specific integrated circuit (ASIC), a field programmable gate array (FPGA), a digital signal processor (DSP), network processor, or the like. Processing device 102 is configured to execute the processing logic (instructions 122) for performing the operations and steps discussed herein.

The computing device 100 may further include a network interface device 108. The computing device 100 also may include a video display unit 110 (e.g., a liquid crystal display (LCD) or a cathode ray tube (CRT)), an alphanumeric input device 112 (e.g., a keyboard or touchscreen), a cursor control device 114 (e.g., a mouse or touchscreen), and an audio device 116 (e.g., a speaker).

The data storage device 118 may include one or more machine-readable storage media (or more specifically one or more non-transitory computer-readable storage media) 128 on which is stored one or more sets of instructions 122 embodying any one or more of the methodologies or functions described herein. The instructions 122 may also reside, completely or at least partially, within the main memory 104 and/or within the processing device 102 during execution thereof by the computer system 100, the main memory 104 and the processing device 102 also constituting computer-readable storage media.

For comparative purposes, FIG. 2A illustrates the general steps of a known software build process. Here, source files ".c" are compiled by a compiler to create object files ".o". The object files are then archived by an archiver to form libraries ".lib" which are in turn linked by a linker (sometimes referred to as an integrator) to form a final binary file ".bin". Each of the complier, archiver and integrator may be implemented on a computing device 100 such as that described in FIG. 1. The archiver, compiler and integrator may each be implemented on an independent computing device 100, or any combination of the archiver, compiler and integrator may share a computing device upon which they are implemented. For example, the compiler and archiver may be integrated on a first computing device 100 and the integrator may be implemented on a second computing device 100. Where multiple computing devices 100 are provided, these may communicate over any appropriate communications network.

In many conventional scenarios the compiler and archiver may be under control of a first entity, while a second entity may aggregate libraries from multiple sources through implementation of a linker/integrator. Box 210 in FIG. 2A illustrates the entities under control of the first entity. Accordingly, when the binary .bin file is produced, multiple entities have had access to the code, increasing potential security risks as well as stability risks where coordination between entities is imperfect. The present disclosure provides a build process which mitigates such risks. In particular, this build process enables on-demand code decryption. Such a build process is illustrated in FIG. 2B.

Figure 2B:
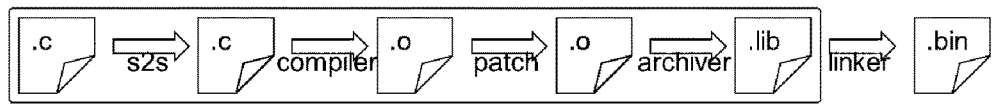
FIG. 2B illustrates a compiling process according to the preferred embodiment.

In comparison to FIG. 2A, FIG. 2B illustrates two additional build steps. Firstly, an "s2s" source-to-source transformation transforms an input source file .c into an output source file .c. This is then compiled by a compiler to form an object file in line with the process of FIG. 2A. This object file is then an input object file for an object-to-object transformation labelled as "patch" in FIG. 2B, which generates one or more output object files.

Figure 3:
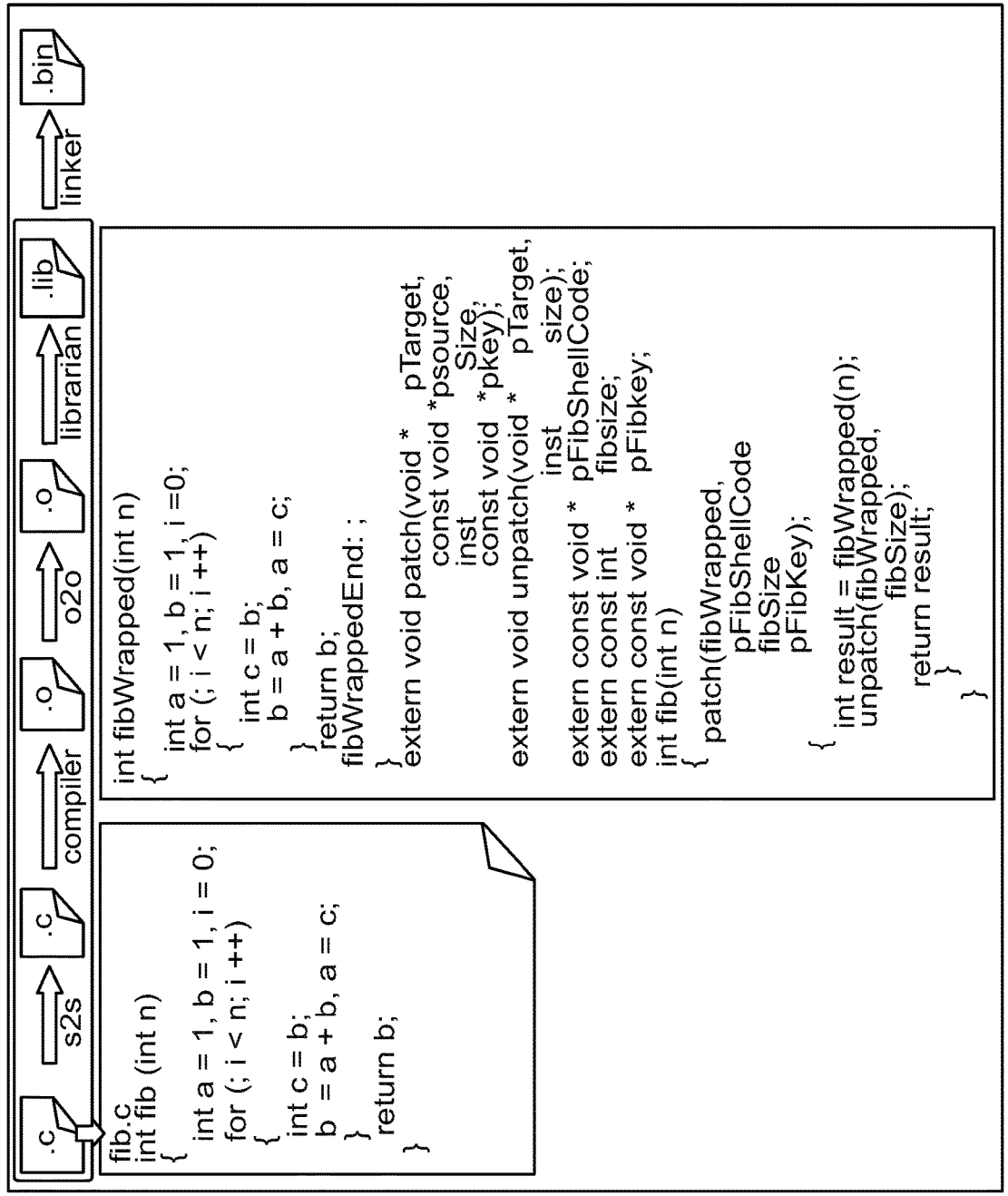
FIG. 3 illustrates a source-to-source transformation within the compiling process of the preferred embodiment.

The source-to-source transformation can be understood with reference to FIG. 3, which illustrates an example of such a process. In particular, the source-to-source transformation isolates and marks the code to be protected with markers. The operation "fibWrapped" identifies this code. Additionally, during this transformation additional code is incorporated to assist in handling the decryption operation. In some examples, an alternative process to encryption may be used to obscure the code to be protected, in which case the decryption operation will be replaced by a suitable alternative.

Figure 4:
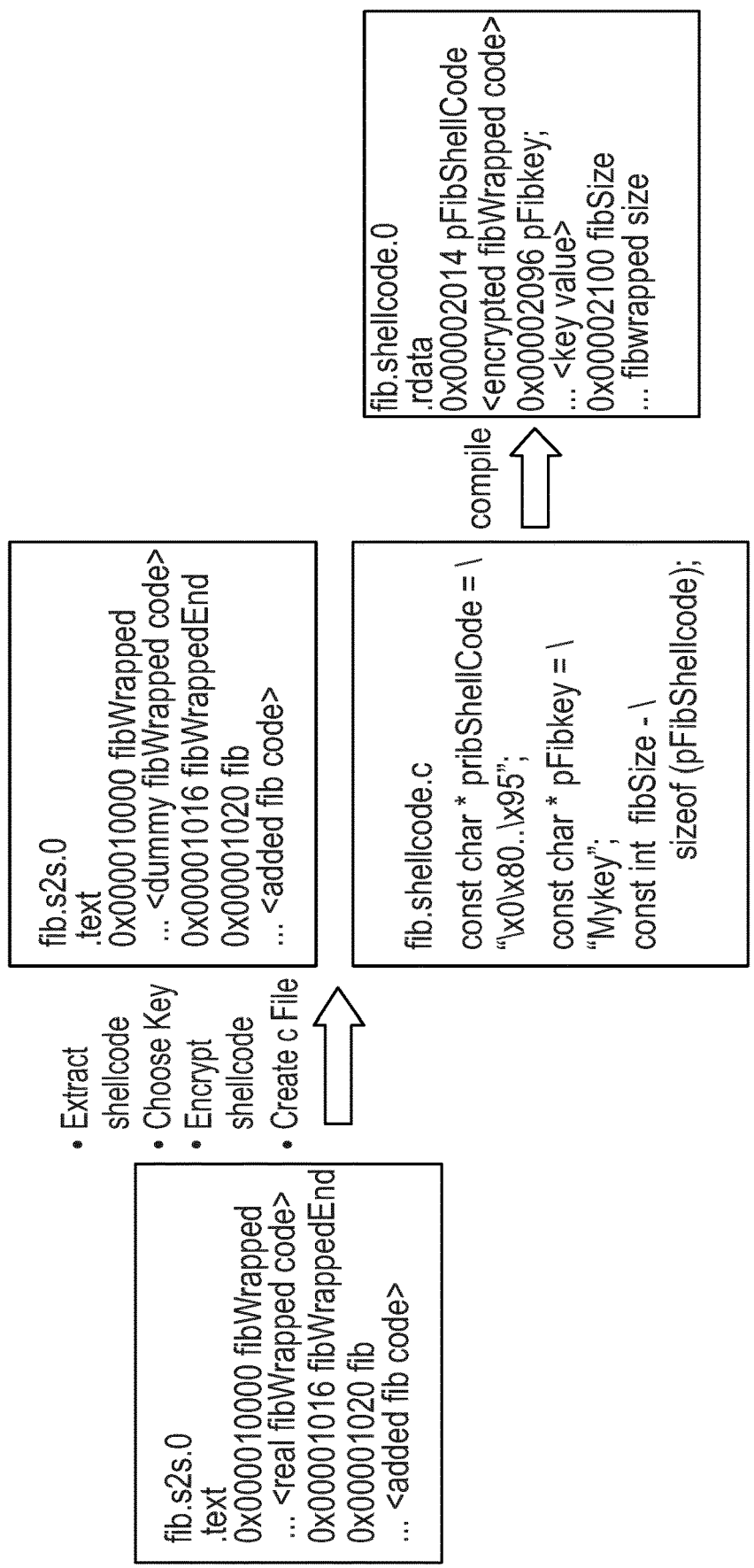
FIG. 4 illustrates an object-to-object transformation within the compiling process of the preferred embodiment.

FIG. 4 illustrates an example of the object-to-object transformation. Here input object file fib.s2s.o contains markers "fibWrapped" and "fibWrappedEnd" allowing the object-to-object transformation to identify the code to be protected. This code is extracted and replaced with dummy code (e.g. fake code) within the object file fib.s2s.o. The dummy code can be selected to resemble real code, and may be, for example, junk code, real code or seemingly meaningful code. In other examples, the dummy code code may be random code. The modified object file fib.s2s.o may be considered a first output object file.

In addition, the object-to-object transformation may generate an intermediate source file fib.shellcode.c. This intermediate source file is used to encrypt the code to be protected using an encryption operation matching the decryption operation injected during the source-to-source transformation and a give secret key. The secret key may be pre-defined or may be defined such that it can be derived during the object-to-object transformation or at another time. The encryption operation may be replaced with an alternative form of obfuscation, which may be weaker, in order to minimize overheads and potential performance penalties.

The intermediate source file is compiled during the object-to-object transformation to generate a second output object file, referred to as "fib.shellcode.o" in FIG. 4. The second object file carries the encrypted or otherwise obscured code to be protected in a data section.

The first and second object files may subsequently be consolidated to form a single, consolidated output object file, although this is not required in all embodiments. In this manner, a one-to-one relationship may be achieved between object files used as an input to the object-to-object transformation and those that are output from this process. The approach to object file consolidation will vary in dependence on the toolchain. In some examples, a COFF-format parser may be developed and the process may involve reading both object files, consolidating them according to the Microsoft COFF specification and writing the consolidated file back to disk. In other examples, there may be toolchain-provided tools to carry out this consolidation.

The object file(s) generated by the process of FIGS. 2B, 3 and 4 can then be passed to an integrator/linker for linking. The integrator does not need to take further steps to ensure that on-demand decryption is possible and does not need to carry out any post-link process. Furthermore, since the code delivered to the integrator is already encrypted, static analysis of the library at this stage is inhibited, increasing the security of the code.

Figure 5:
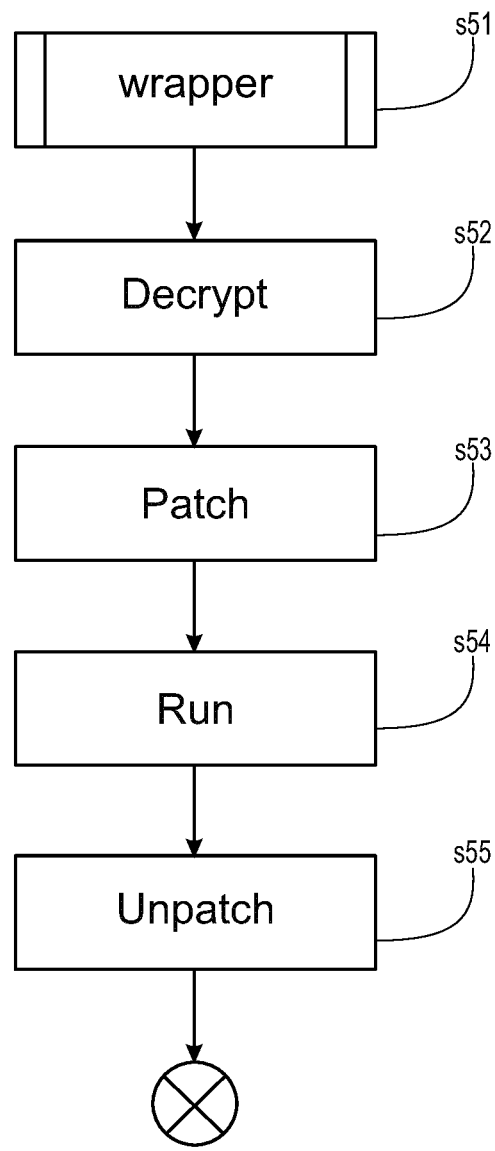
FIG. 5 shows a flow chart of an on-demand decryption process.

FIG. 5 illustrates a process of on-demand decryption subsequently carried out when the software is run. Firstly, ultimate .bin binary wrapper is obtained at step s51 and the relevant function code (i.e. the code that has been protected) can be retrieved. This is decrypted at step s52 and then patched at step s53 into its source location, replacing the fake code that had been located there. The program may then be run, at step s54. Subsequently, the function code is unpatched at step s55, once again obscuring this code from static analysis.

During the patching step s53, certain areas may be preserved, particularly areas modified by the linker after encryption was completed. An example process will be described in more detail below with reference to FIGS. 6 to 8. At link step, the linker modifies the code, updating offsets in CALL instructions to the relevant target functions. As this cannot be pre-computed in the encrypted code, in this approach described below with reference to FIGS. 6 to 8, these are anticipated, such areas are identified prior to encryption, and then preserved so that the result after patching is a proper, correct code. An alternative approach might involve a process of obfuscation OBF, and its symmetric UNOBF, that would work with the linker so that LINK(area)=UNOBF(LINK(OBF(area))); this alternative may avoid the requirement to preserve areas.

Figure 6:
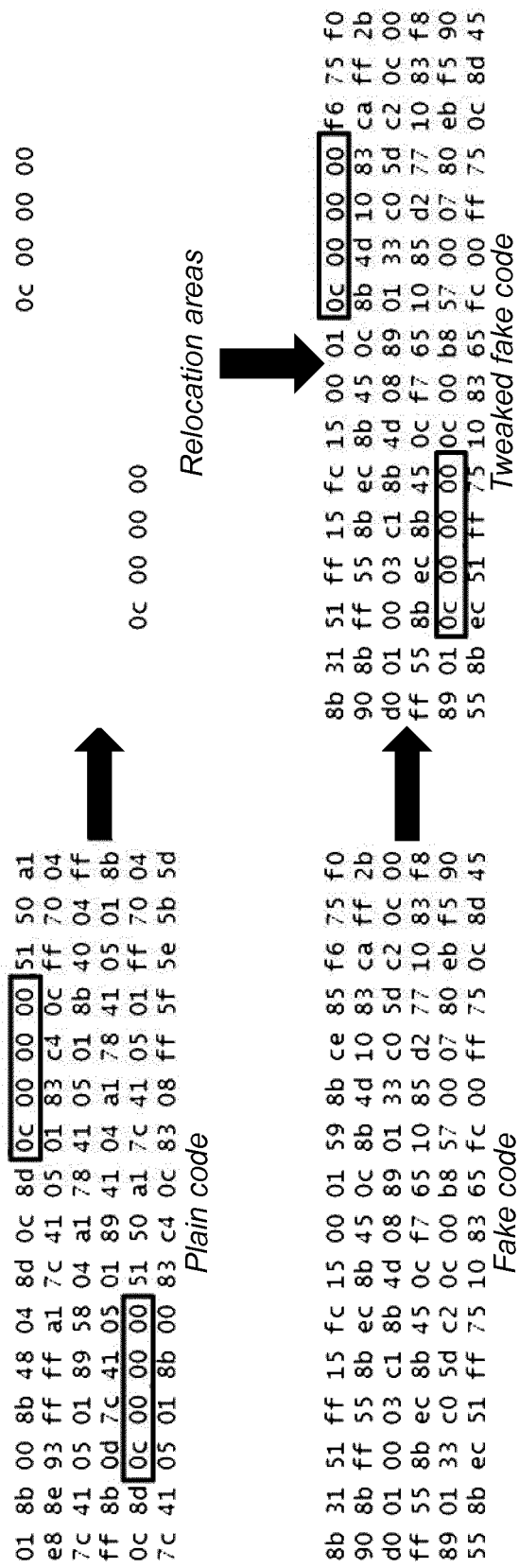
FIG. 6 shows areas of the code from processing which are to be excluded as relocation directions.
Figure 7:
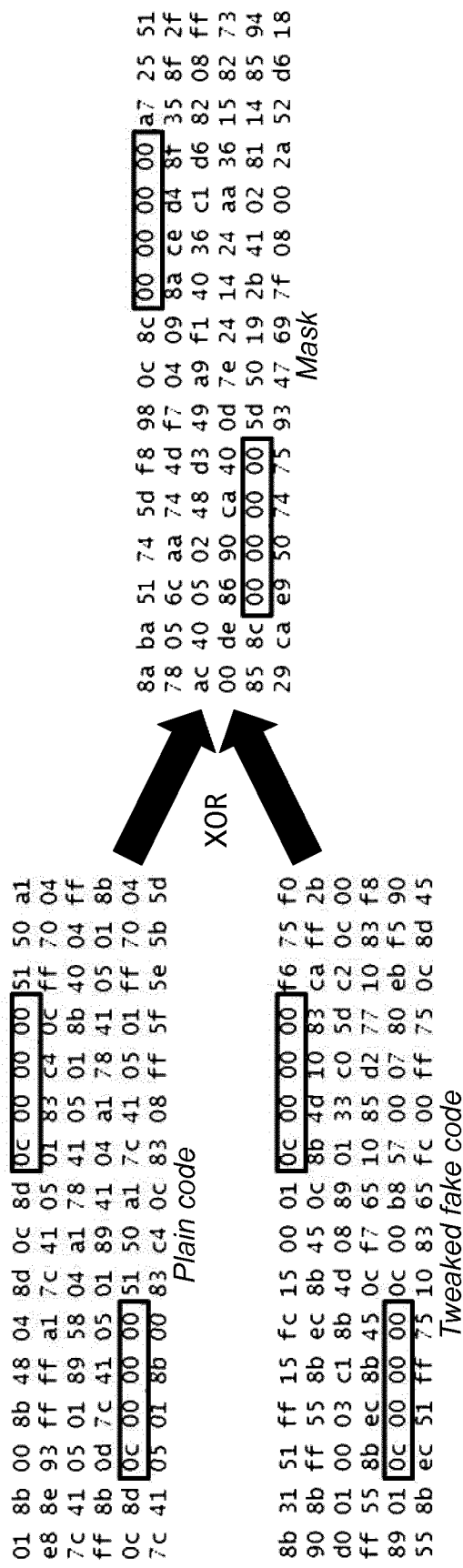
FIG. 7 shows generation of a mask to be applied to protect excluded areas during on-demand code decryption.
Figure 8:
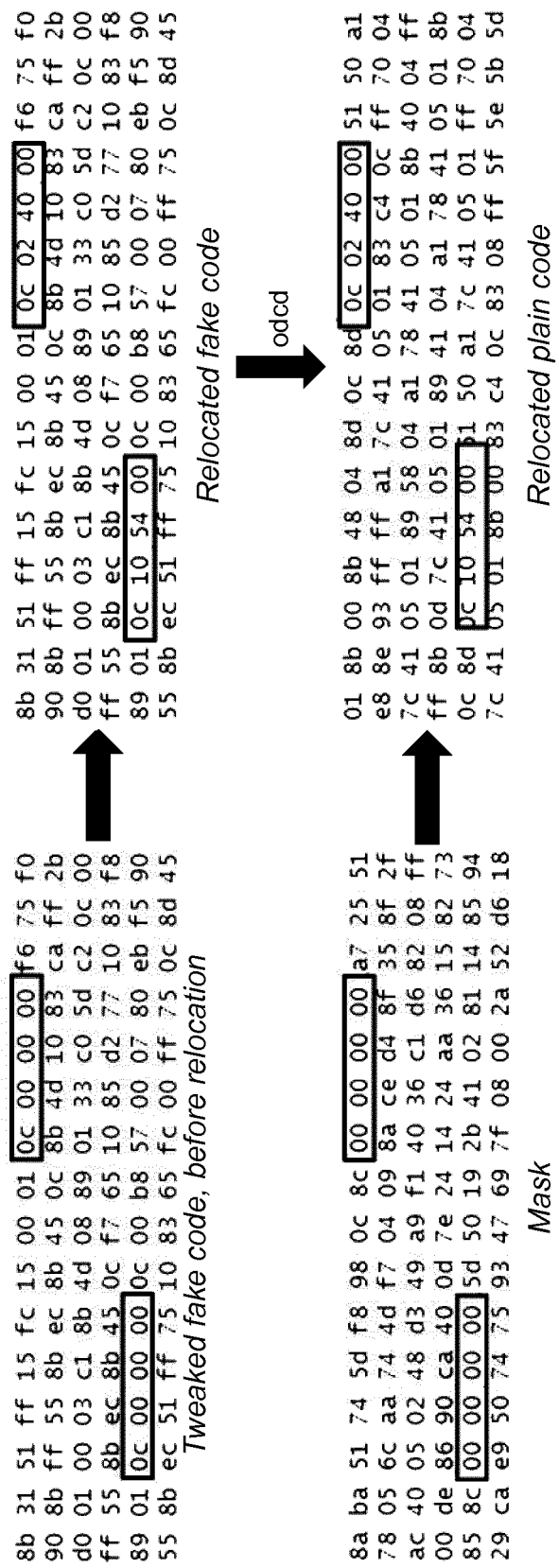
FIG. 8 illustrates a process of on-demand code decryption that does not influence relocation addresses.

As mentioned above, further details of some preferred embodiments are illustrated in FIGS. 6 to 8. Here it is recognized that relocation processes may require unaltered code. Such relocation processes can occur during the linking process and when the program is loaded. In order to avoid interference with this process, during the object-to-object transformation areas which are used for relocation directions can be excluded from replacement by the fake code. In particular, the areas used for relocation directions may be areas targeted by relocation commands. As a result, the fake code finally provided will include relocation directions that are unaltered from the original code.

FIG. 6 illustrates an example. The original, "plain" code in the input object file includes two highlighted regions which are the target of relocation operations. The fake code is modified so that these regions are not replaced and values remain constant in these regions.

A mask may then be generated to ensure any data provided to the regions during relocation is not overwritten during the on-demand decryption process at run-time. The mask may be generated by comparison of the (decrypted) code to be protected and the equivalent area within the output object file. This is illustrated in FIG. 7; an XOR operation identifies where the two sets of code are identical, thus indicating where no substitution has been made.

Relocations occur during linking and loading processes, as illustrated in FIG. 8. The mask is then utilized to ensure that during the on-demand decryption process these relocations remain effective by inhibiting the patching of the code that has been protected into the regions reserved for such relocations.

The decryption process of in some embodiments can be further understood with respect to FIGS. 9 to 11. Here, integrity of the data is monitored through the calculation of checksums. Since the dummy code within an on demand decryption area is modified during processing (as fake code is replaced by real code) a particular approach is required to ensure checksum values are constant in normal operation. In these embodiments, the approach taken uses a "duplication table". The duplication table is a data area which can be modified during the process and thus acts as compensation area.

As illustrated in FIGS. 10A to 10E, the runtime code ("Code A") is maintained in an encrypted area 10. The runtime code is stored as the result of an XOR operation between the runtime code and the fake code ("Garbage Code A") maintained in the on demand code decryption area 12. "Holes" 14 are provided in the runtime code corresponding to the mask described in FIGS. 6 to 8. The fake code in the on demand code decryption area 12 is provided with relocation directions 16 at locations corresponding to the holes. the duplication table 18 is also illustrated in FIG. 10

Figure 10A:
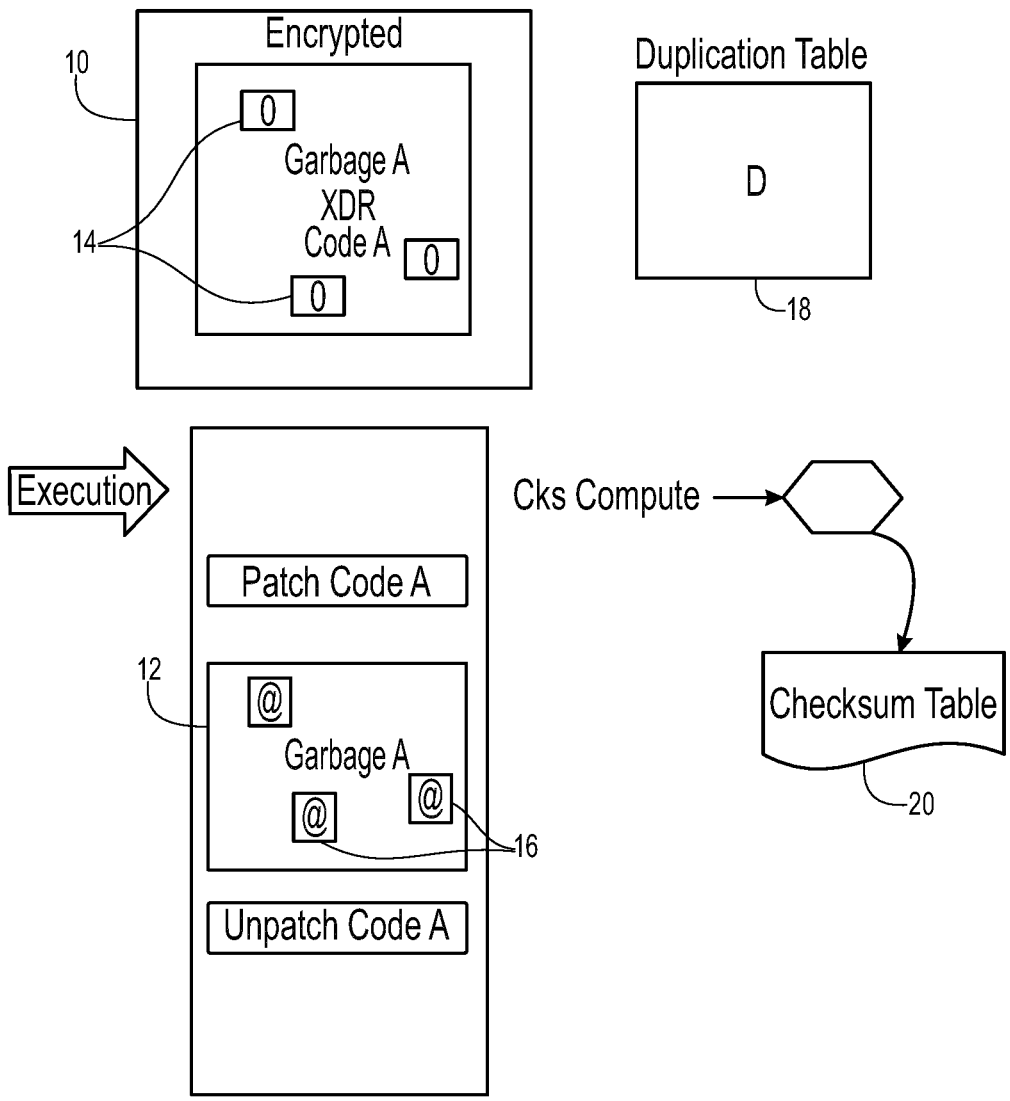
FIGS. 10A to 10E illustrate aspects of the process of FIG. 9 in an embodiment.

FIG. 9 shows a flow table for the process. Firstly, one or more object files are received at step s91. These object files include the encrypted area 10 and the on demand code decryption area 12. Checksums can be calculated for parts of the object file not protected by on demand code decryption as illustrated in FIG. 10A.

A duplication table is generated at step s92. In the embodiment shown in FIG. 10, initially the duplication table 18 is blank (i.e. set at 0). The ODCD area 12 is initialized with a fake code but with correct relocation directions as mentioned above.

Figure 10B:
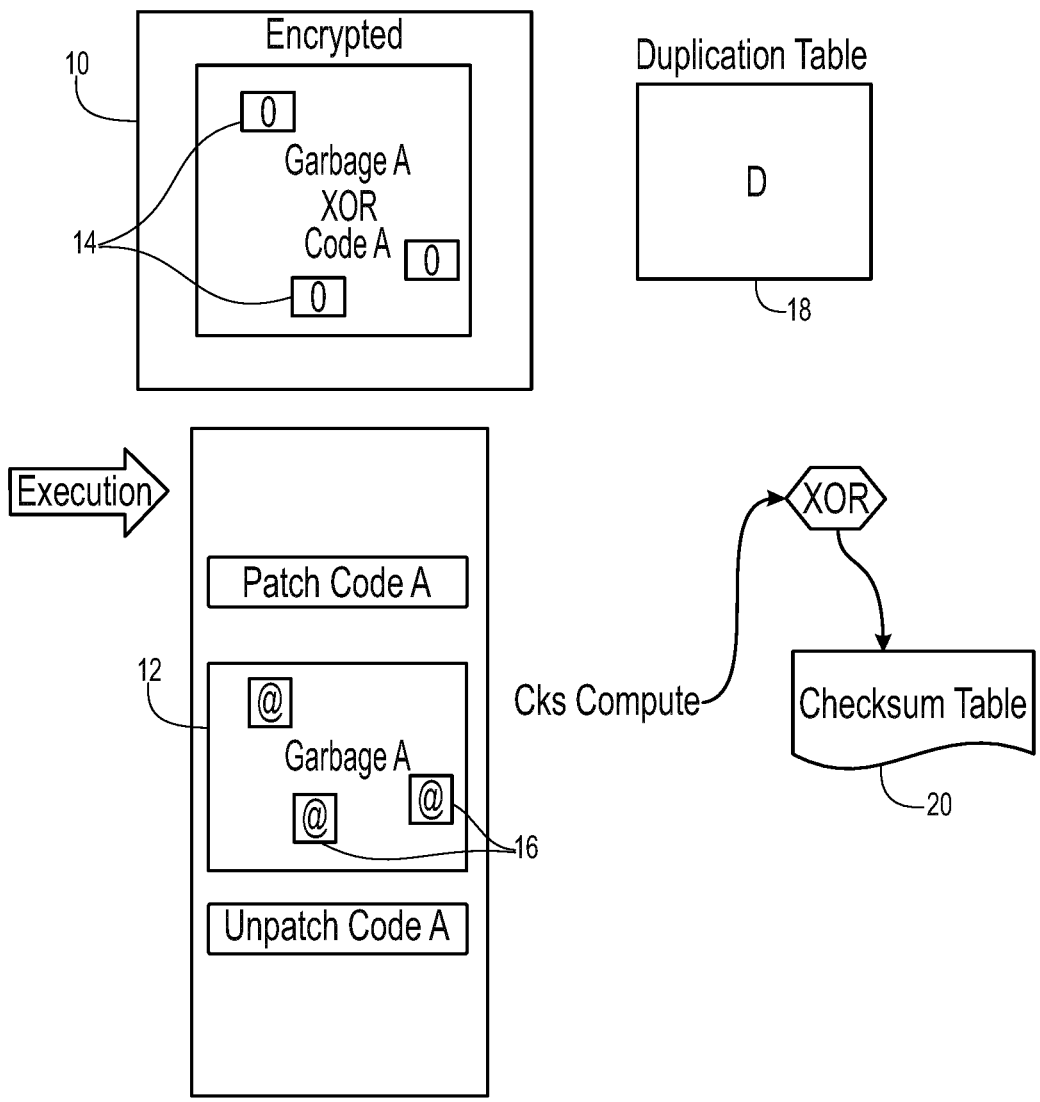

As illustrated in FIG. 10B, a checksum may then be calculated at step s93. This will generate a first checksum result which may be stored in a checksum table 20. The checksum is calculated based on the result of an XOR operation between the ODCD area 12 and the duplication table 18. That is to say, the operation (ODCD area XOR Duplication Table)=Fake code XOR 0=Fake code is carried out and the checksum is calculated on this. In essence this gives a checksum result based on the fake code in this example.

Figure 10C:
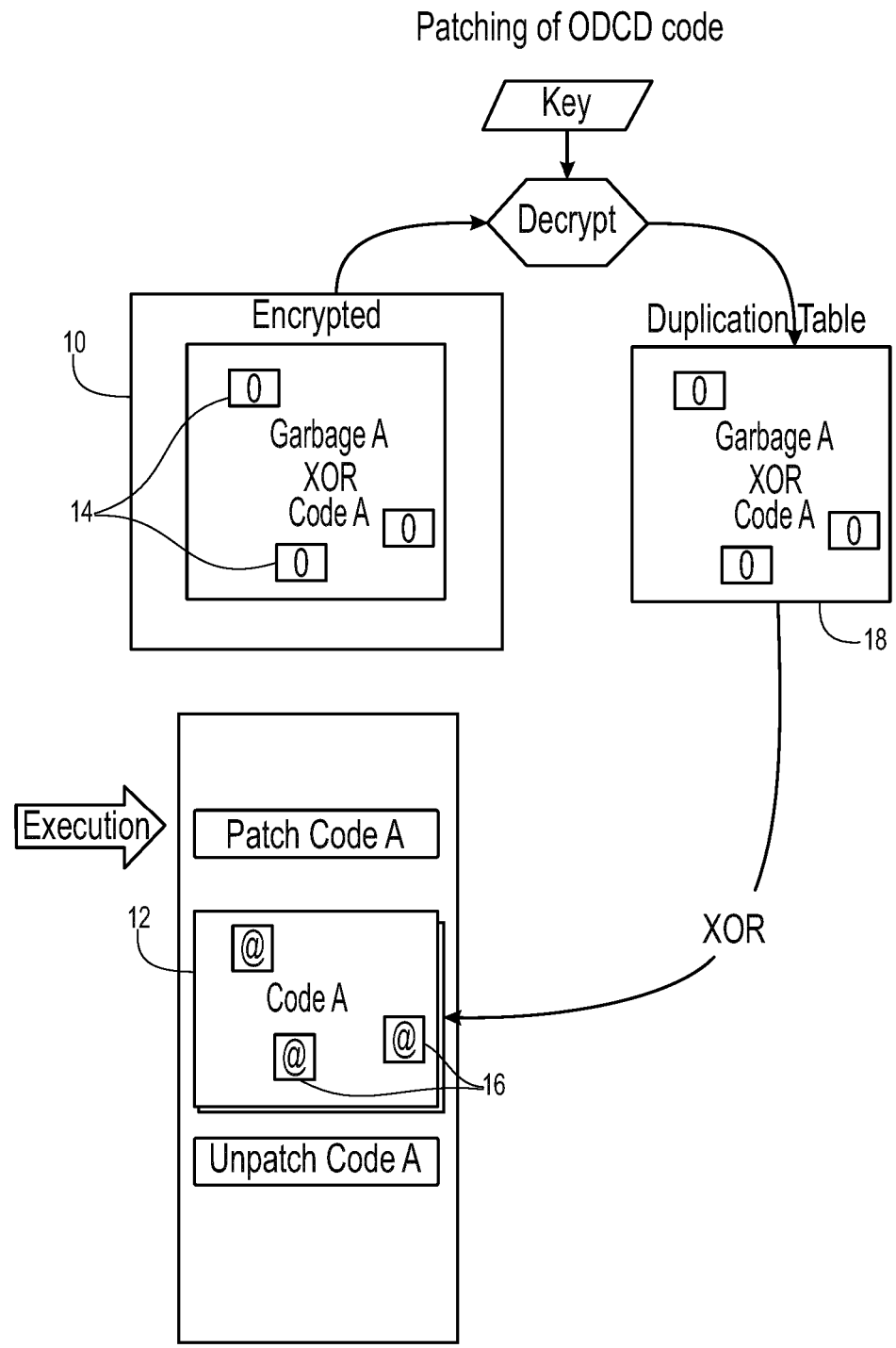

During ODCD the fake code is replaced by runtime code. As such, a second checksum based only on the ODCD area 12 after this would return a different answer to the first checksum result. In this embodiment, at step s94, the duplication table is populated with the result of the operation runtime code XOR fake code. Note that the runtime code includes "holes" of value 0 corresponding to the positions of relocation directions in the fake code. As illustrated in FIG. 10C, this process of populating the duplication table 18 may comprise decrypting the information stored in the encryption area 10 using a decryption key.

FIG. 10C also helps to illustrate step s95, at which the runtime code (with the exception of the holes) replaces the fake code within the on demand decryption area 12. This can be performed by carrying out an XOR of the duplication table 18 with the fake code within the ODCD area 12= [runtime code XOR fake code] XOR fake code=Real runtime code with expected relocations added (in place of the "holes").

At step s96, the real runtime code with relocations added may be executed. This step can occur earlier or later in the process and may not occur at all.

Figure 10D:
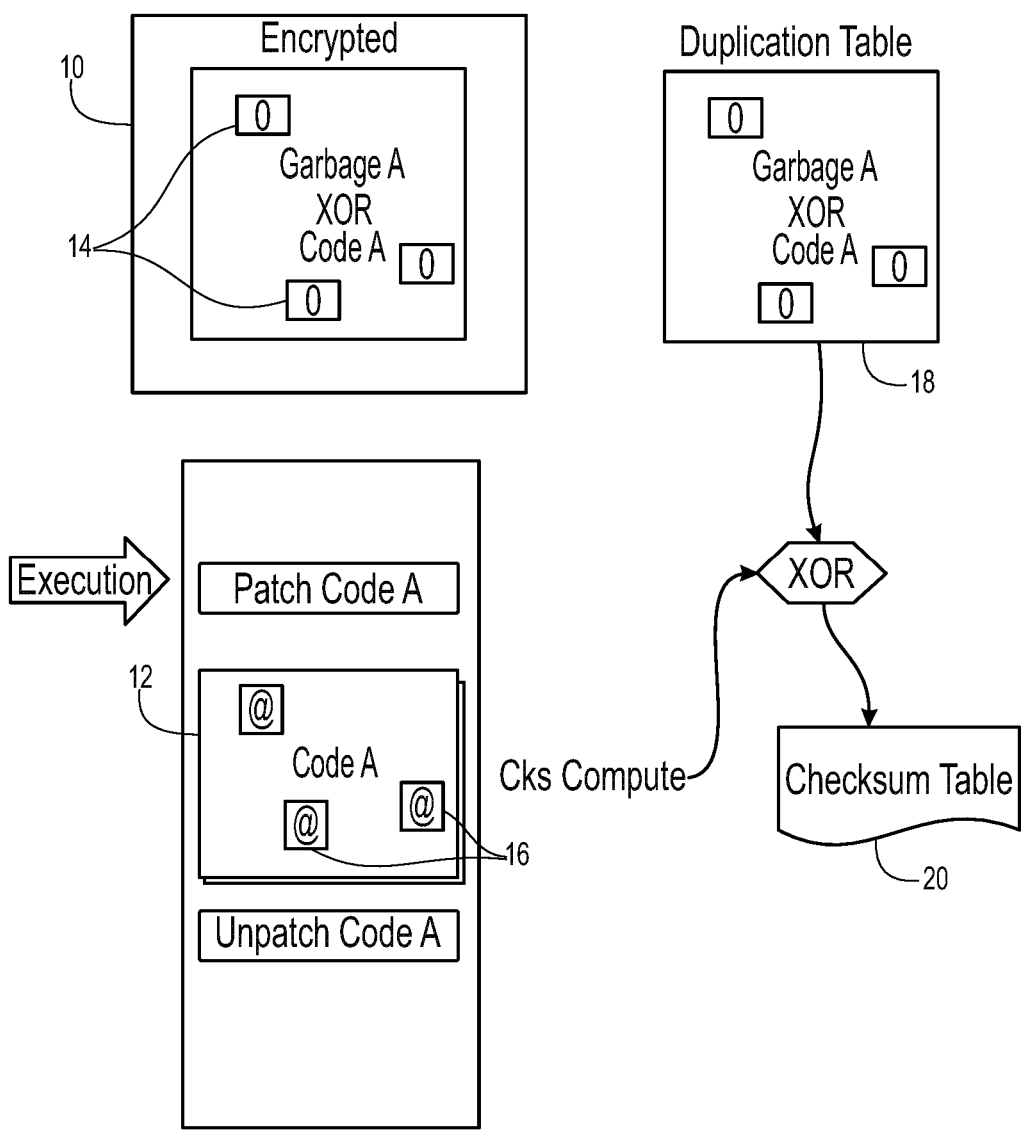

At step s97, which can be understood with reference to FIG. 10D, a second checksum result is calculated. Again, the checksum is based on the result of an XOR operation between the code within the ODCD area 12 and the duplication table 18. This XOR operation provides (Real runtime code having relocations added XOR the duplication table) =[Runtime code with relocations added] XOR [runtime code including holes XOR fake code]=fake code. As such, first and second checksums are both calculated on the fake code and provide the same value.

The first and second checksum results may then be used to step s98 to assess integrity of the fake code and/or real code. For example, since both results should be identical, a comparison of the two results which shows a change would imply a loss of integrity. Moreover, the checksum results may be compared with an expected value, or may be used in a process having operation dependent upon the checksum results. That is to say, the alteration of a checksum result from its expected value may be inferred from the result of a further process.

Figure 10E:
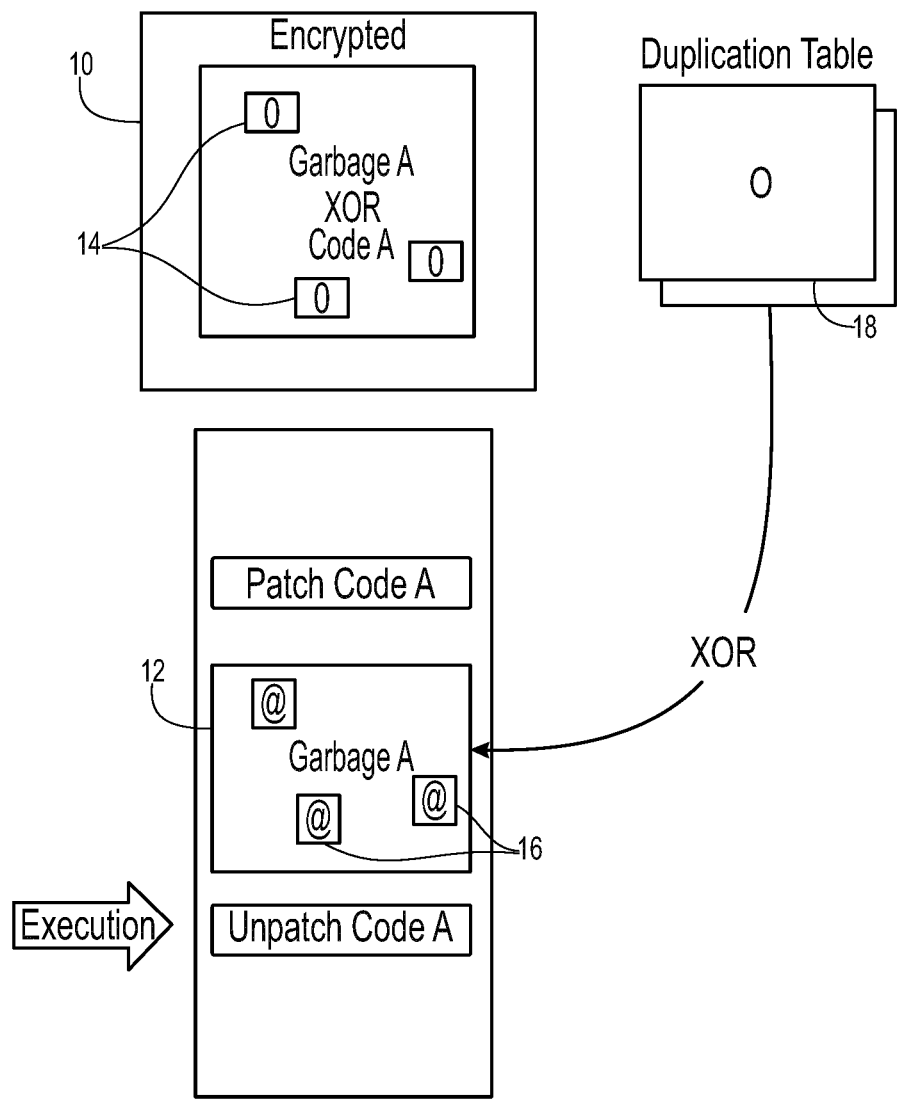
Figure 11A:
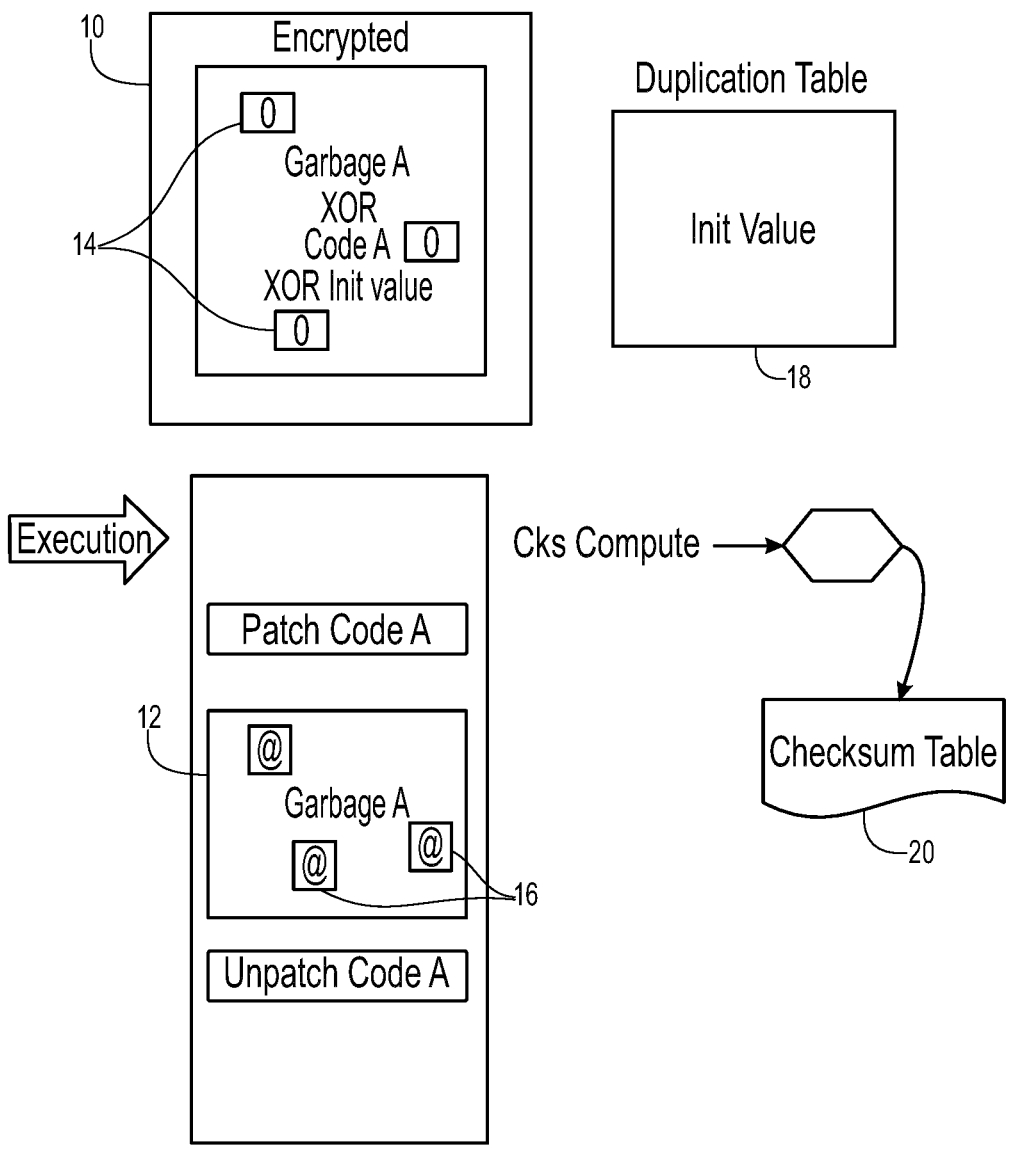
FIGS. 11A to 11E illustrates aspects of the process of FIG. 9 in an alternative embodiment.
Figure 11B:
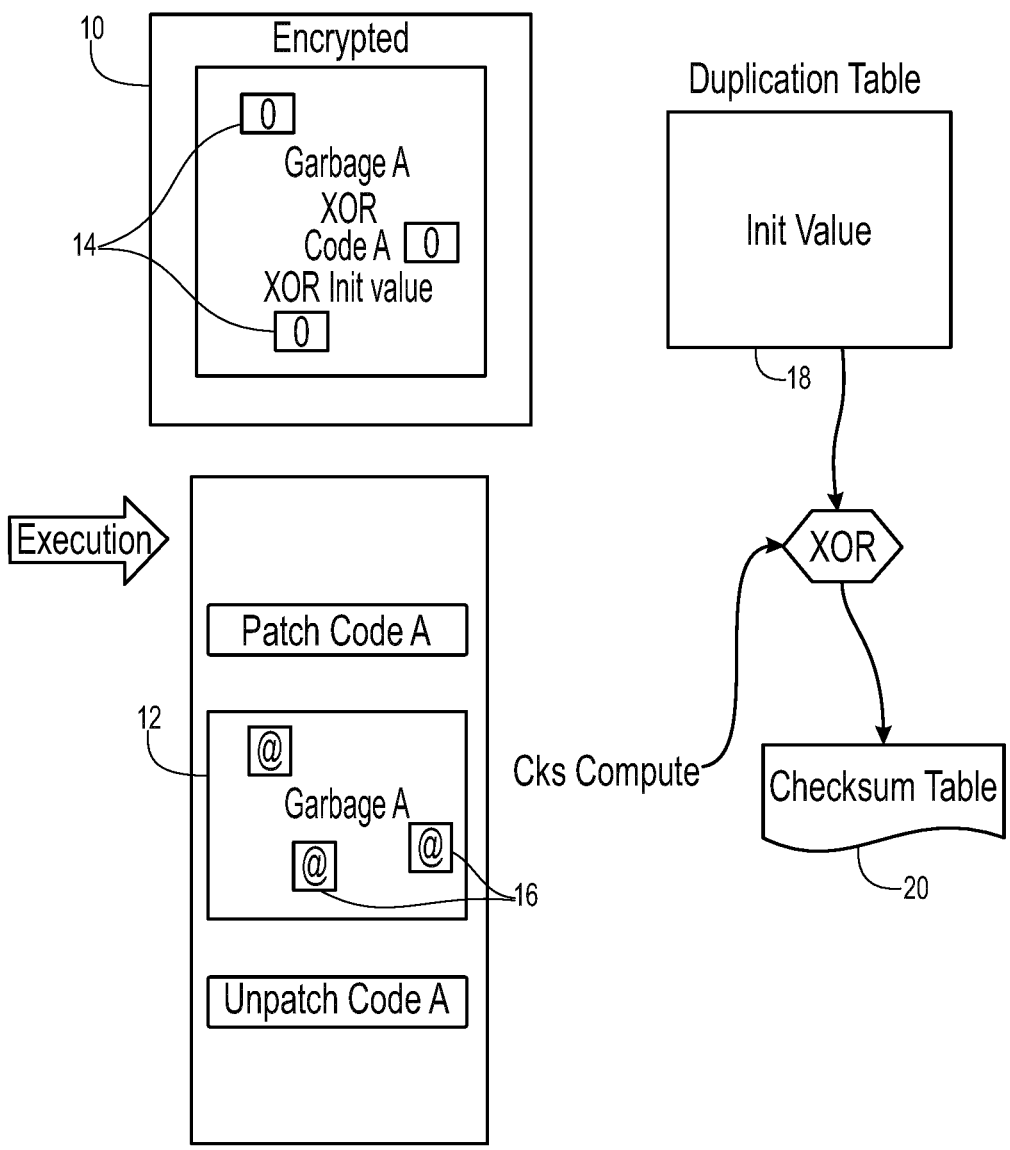
Figure 11C:
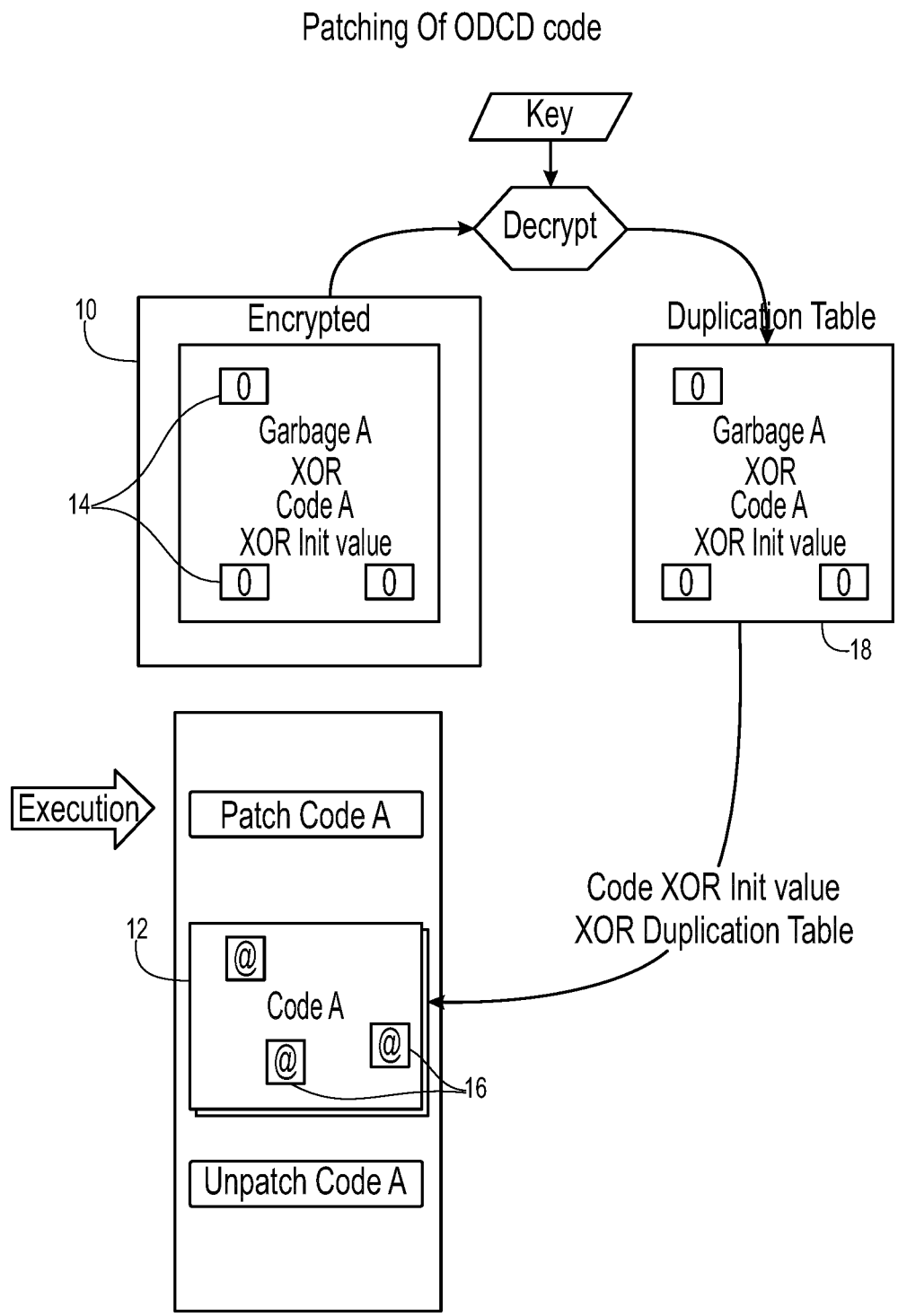
Figure 11D:
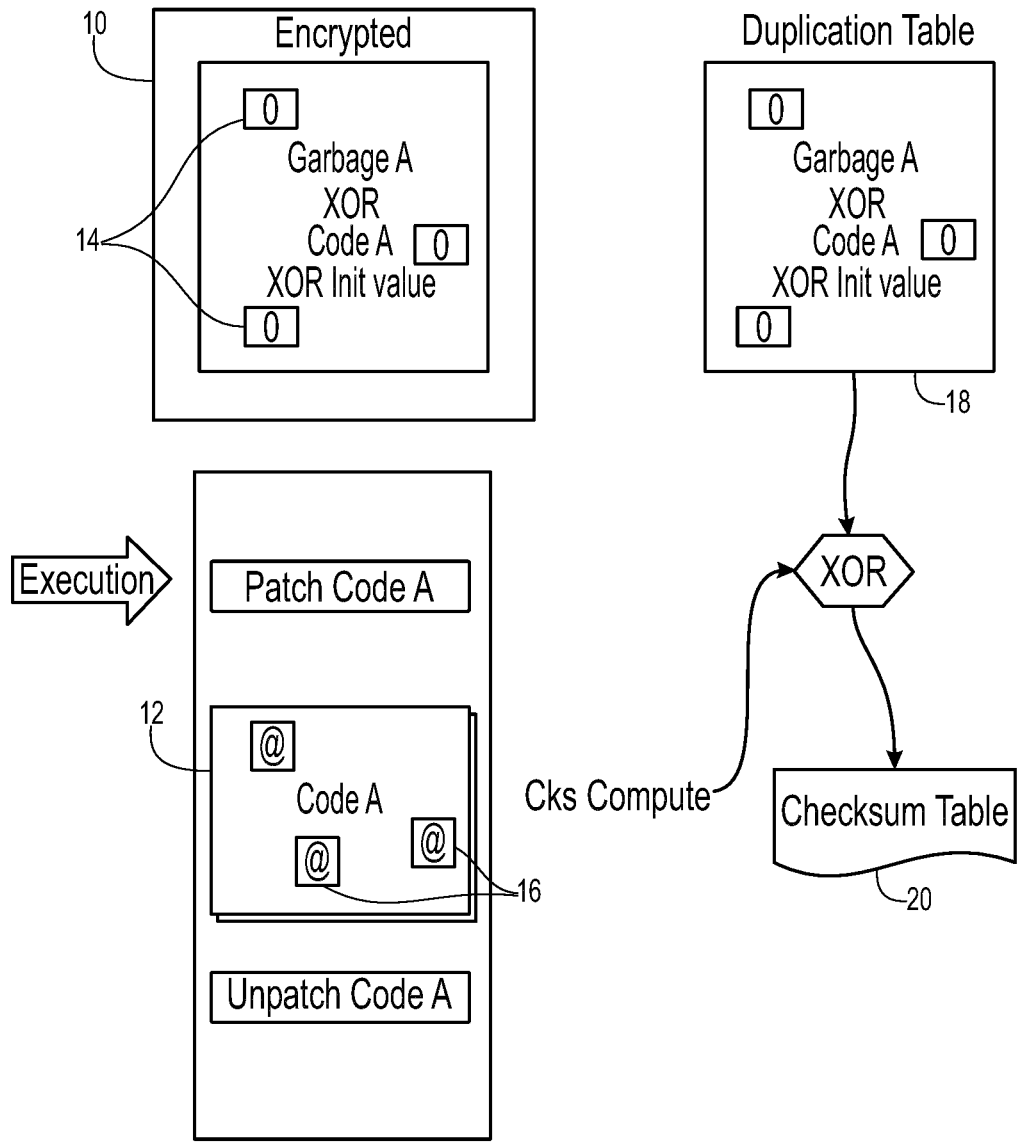
Figure 11E:
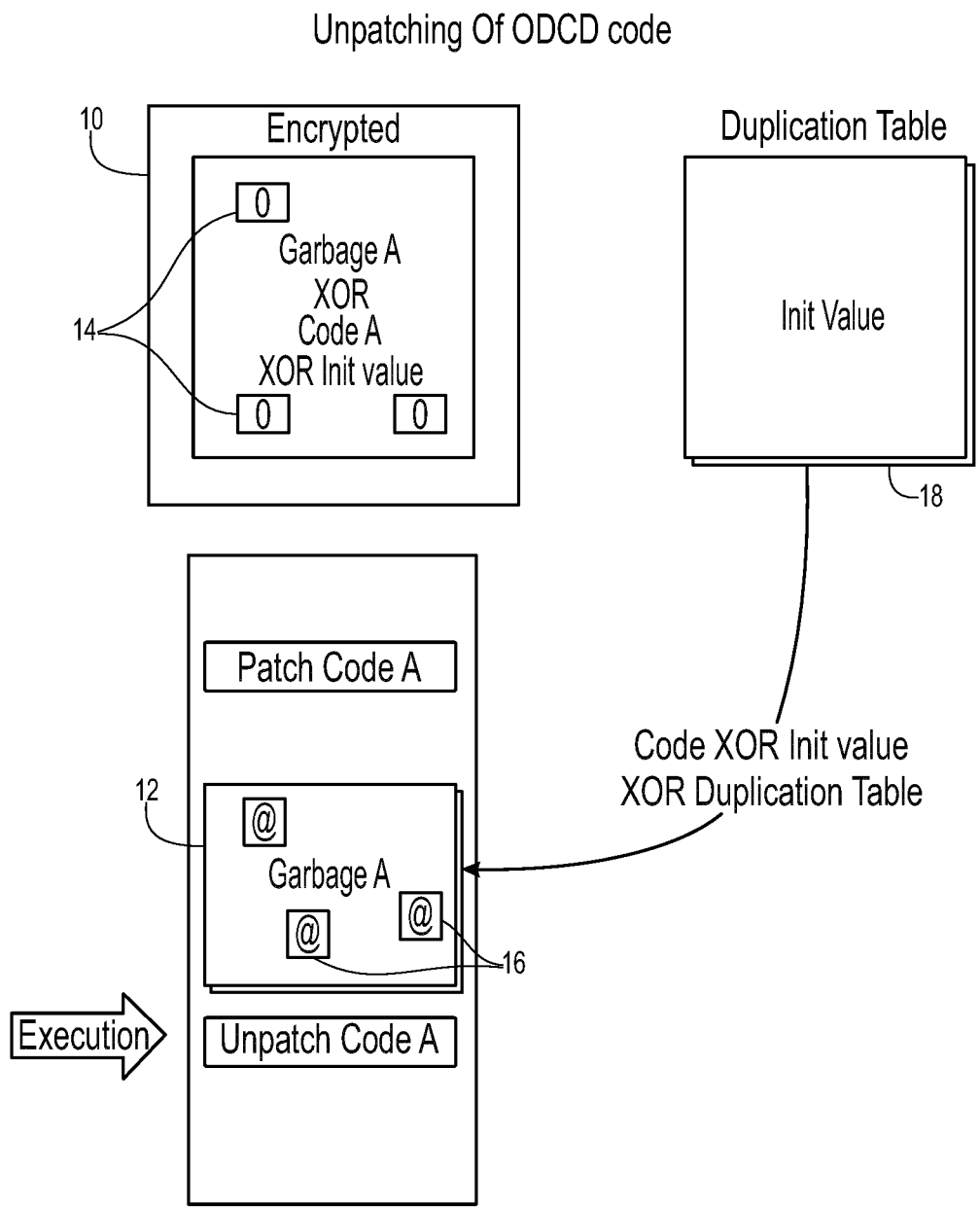

At step s99, illustrated in FIG. 10E, the ODCD area 12 is returned to its original state and the duplication table is re-initialized to zero. To return the ODCD area 12 to its original state its contents can be replaced by the result of the computation: (contents of ODCD area 12 XOR contents of duplication table 18)=fake code.

By virtue of this approach, if tampering is done on the fake code or the decrypted code, tampering will persist after XOR transformation and will be detected by the integrity check at step s98. The checksum computations are always carried out on the same areas (i.e. ODCD area 12 XOR duplication table 18), but the duplication table 18 effectively compensates for changes to the contents of the ODCD area 12 during the on demand code decryption or encryption. Moreover, relocation directions can be readily handled using the "holes" described with reference to FIGS. 6 to 8 above.

In the example described above with reference to FIGS. 9 and 10, the initial state of the duplication table 18 is blank (or set to zero). Alternative embodiments may adopt an alternative initial value. FIGS. 11A to 11E (which correspond to the equivalent steps to the process described with reference to FIGS. 10A to 10E) illustrate one such scenario. In this example, the duplication table 18 takes an initial value labelled "init value". This initial value is included in XOR operations when populating the ODCD area 12 or the duplication table 18 and thus persists in such a way as to ensure consistency of the checksum values.

In the description above, the "holes" provided in the real time code take the value zero, but in alternative embodiments different predefined values may be adopted. The predefined value for the holes is The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein (for example control unit 110 in relation to FIG. 1) can be implemented as discrete components or integrated in the functionality of hardware components such as ASICS, FPGAs, DSPs or similar devices as part of an individualization server.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining," "identifying," "replacing," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. For example, while the illustrated embodiments utilise fake code, they could equally be implemented with any other form of dummy code in its place. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method for monitoring integrity of code, comprising:
receiving one or more files in which dummy code occupies an on demand code decryption area in a computer system and runtime code is provided elsewhere;
initializing a compensation area in the computer system to take an initial value,
calculating a first checksum result that depends on contents of the on demand code decryption area and contents of the compensation area;
populating the compensation area with a result of an operation carried out in dependence on the dummy code and the runtime code;
populating the on demand code decryption area with at least part of the runtime code;
calculating a second checksum result that depends on contents of the on demand code decryption area and contents of the compensation area; and
utilizing the first and second checksum results to infer integrity of one or both of the runtime code and the dummy code.

2. The method according to claim 1, wherein the initial value of the compensation area is zero.

3. The method according to claim 1, wherein:
the first checksum result is calculated on a result of an exclusive or operation between the on demand code decryption area and the compensation area;
the compensation area is populated with a result of an exclusive or operation between the dummy code and the runtime code; and
the second checksum result is calculated on a result of an exclusive or operation between the on demand code decryption area and the compensation area.

4. The method according to claim 1, wherein the on demand code decryption area is populated with a result of an exclusive or operation between the dummy code and the compensation area.

5. The method according to claim 1, wherein relocation directions are provided at defined locations in the dummy code and corresponding locations in the runtime code have a predefined value.

6. The method according to claim 1, further comprising, prior to calculating the second checksum result, executing the runtime code.

7. The method according to claim 1, further comprising, after calculating the second checksum result, populating the on demand decryption area with a result of an exclusive or operation between the on demand decryption area and the compensation area.

8. A non-transitory computer program product comprising computer executable instructions, which when executed by a processor of a computer system, cause the processor to perform operations comprising:
receiving one or more files in which dummy code occupies an on demand code decryption area in the computer system and runtime code is provided elsewhere;
initializing a compensation area in the computer system to take an initial value, calculating a first checksum result that depends on contents of the on demand code decryption area and contents of the compensation area;
populating the compensation area with a result of an operation carried out in dependence on the dummy code and the runtime code;
populating the on demand code decryption area with at least part of the runtime code;
calculating a second checksum result that depends on contents of the on demand code decryption area and contents of the compensation area; and
utilizing the first and second checksum results to infer integrity of one or both of the runtime code and the dummy code.

9. A system for monitoring integrity of code, the system comprising a processor arranged to:
receive one or more files in which dummy code occupies an on demand code decryption area in the system and runtime code is provided elsewhere;
initialize a compensation area in the system to take an initial value,
calculate a first checksum result that depends on contents of the on demand code decryption area and contents of the compensation area;
populate the compensation area with a result of an operation carried out in dependence on the dummy code and the runtime code;
populate the on demand code decryption area with at least part of the runtime code;
calculate a second checksum result that depends on contents of the on demand code decryption area and contents of the compensation area; and utilize the first and second checksum results to infer integrity of one or both of the runtime code and the dummy code.

10. The system according to claim 9, wherein the initial value of the compensation area is zero.

11. The system according to claim 9, wherein:
the processor is arranged to calculate the first checksum result on a result of an exclusive or operation between the on demand code decryption area and the compensation area;
the processor is arranged to populate the compensation area with a result of an exclusive or operation between the dummy code and the runtime code; and
the processor is arranged to calculate the second checksum result on a result of an exclusive or operation between the on demand code decryption area and the compensation area.

12. The system according to claim 9, wherein the processor is arranged to populate the on demand code decryption area with a result of an exclusive or operation between the dummy code and the compensation area.

13. The system according to claim 9, wherein relocation directions are provided at defined locations in the dummy code and corresponding locations in the runtime code have a predefined value.

14. The system according to claim 9, wherein the processor is further arranged to, prior to calculating the second checksum result, execute the runtime code.

15. The system according to claim 9, wherein the processor is further arranged to, after calculating the second checksum result, populate the on demand decryption area with a result of an exclusive or operation between the on demand decryption area and the compensation area.

* * * * *